Oct. 7, 1958 W. L. ARON 2,854,845
PORTABLE GAS METER PROVER
Filed March 31, 1955 7 Sheets-Sheet 1

INVENTOR:
Werner L. Aron
BY MESTERN & FREY
ATTORNEYS

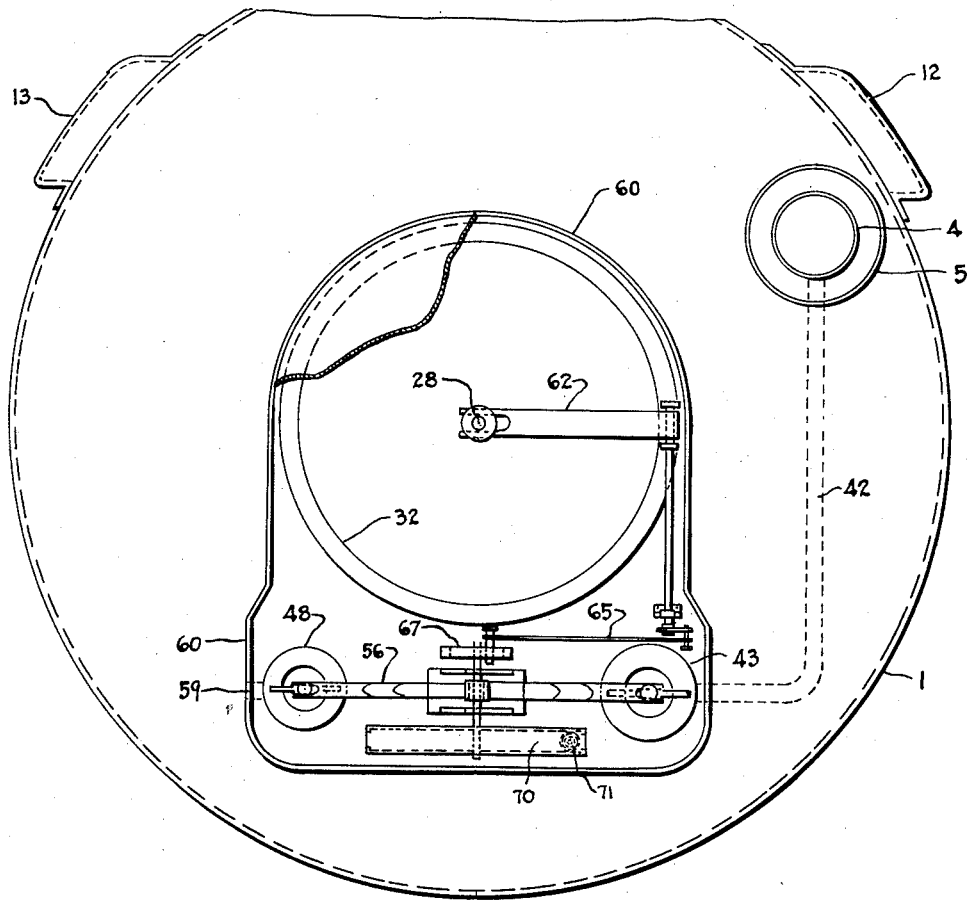
FIGURE II

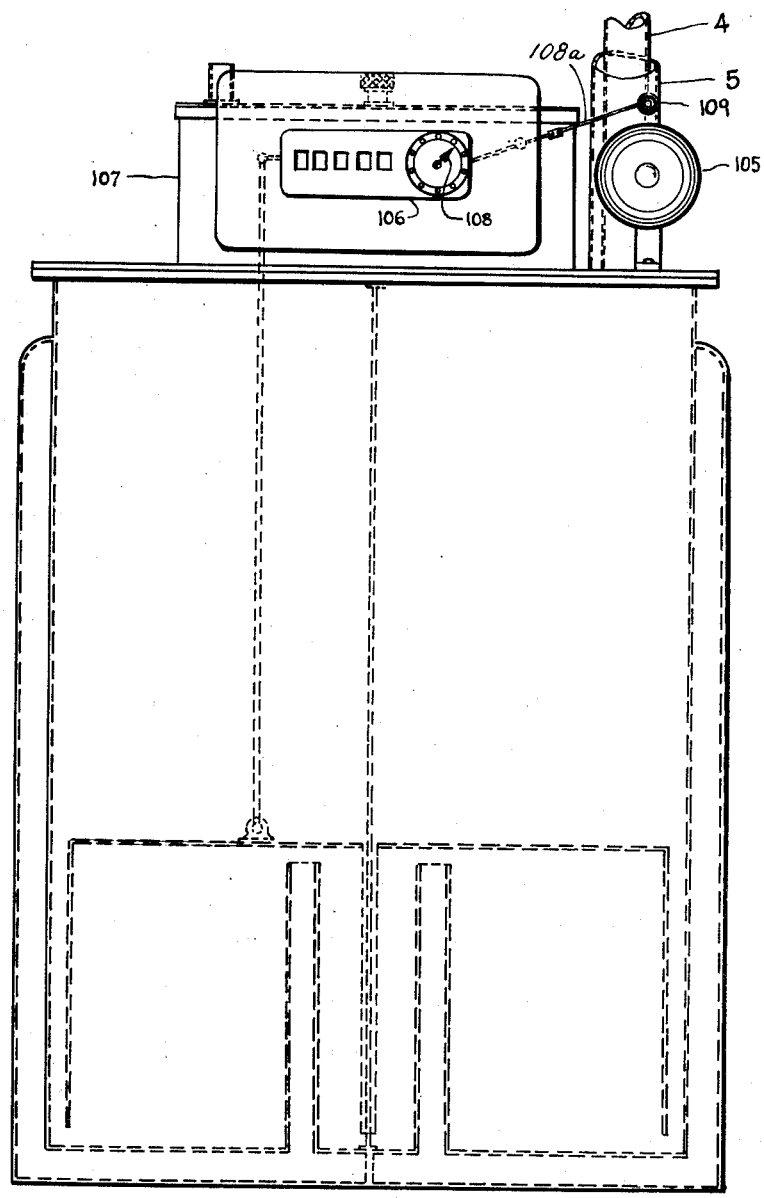
FIGURE III

Oct. 7, 1958
W. L. ARON
2,854,845
PORTABLE GAS METER PROVER
Filed March 31, 1955
7 Sheets-Sheet 4
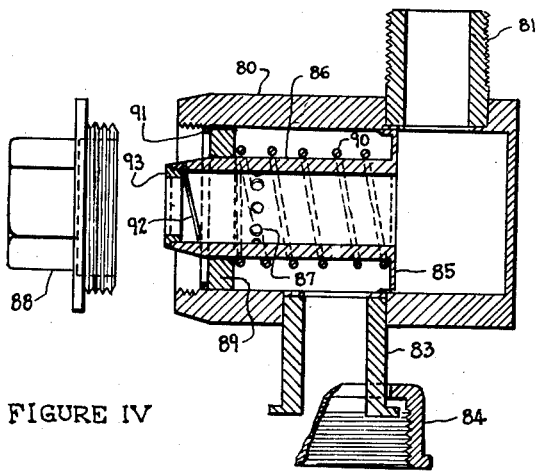
FIGURE IV
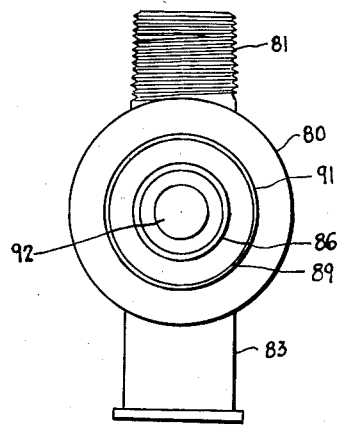
FIGURE V
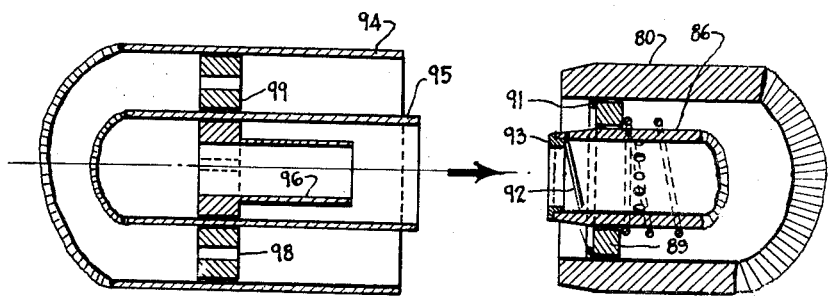
FIGURE VI
FIGURE VII
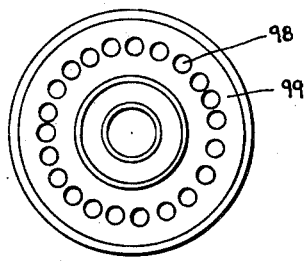
FIGURE VIII
INVENTOR:
Werner L. Aron
BY MESTERN & FREY
Armand E. Mester
ATTORNEYS

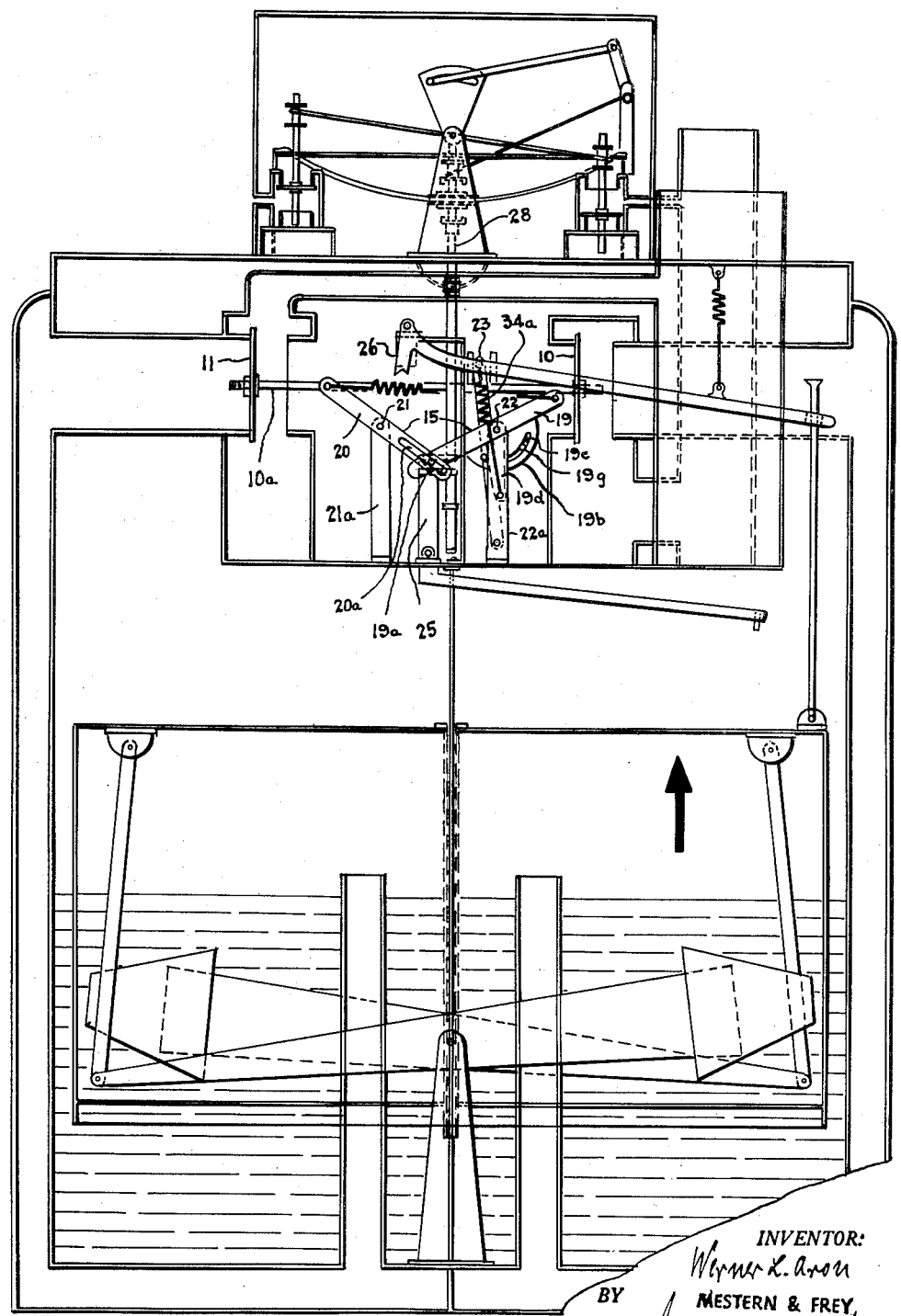
FIGURE IX

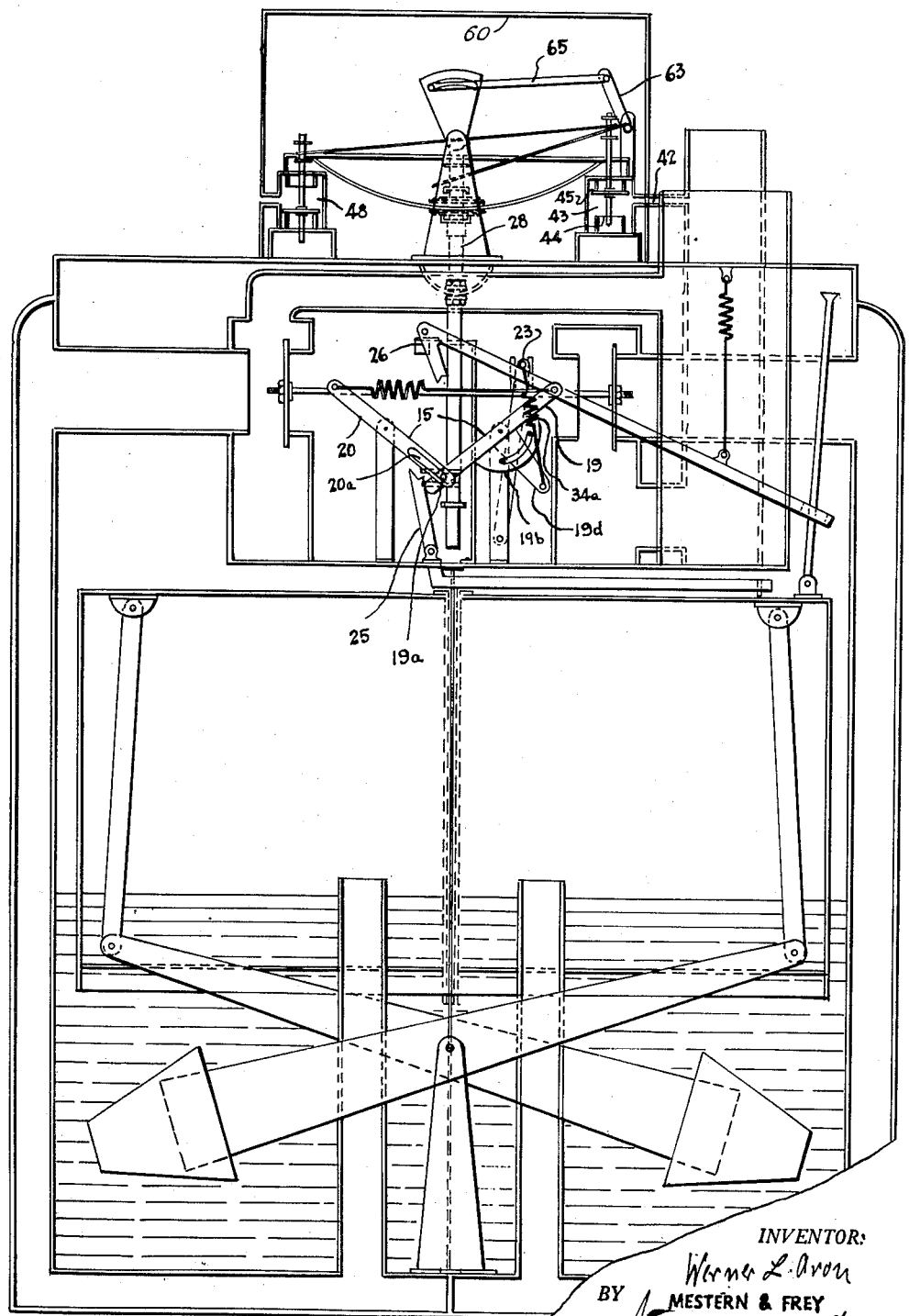
FIGURE X

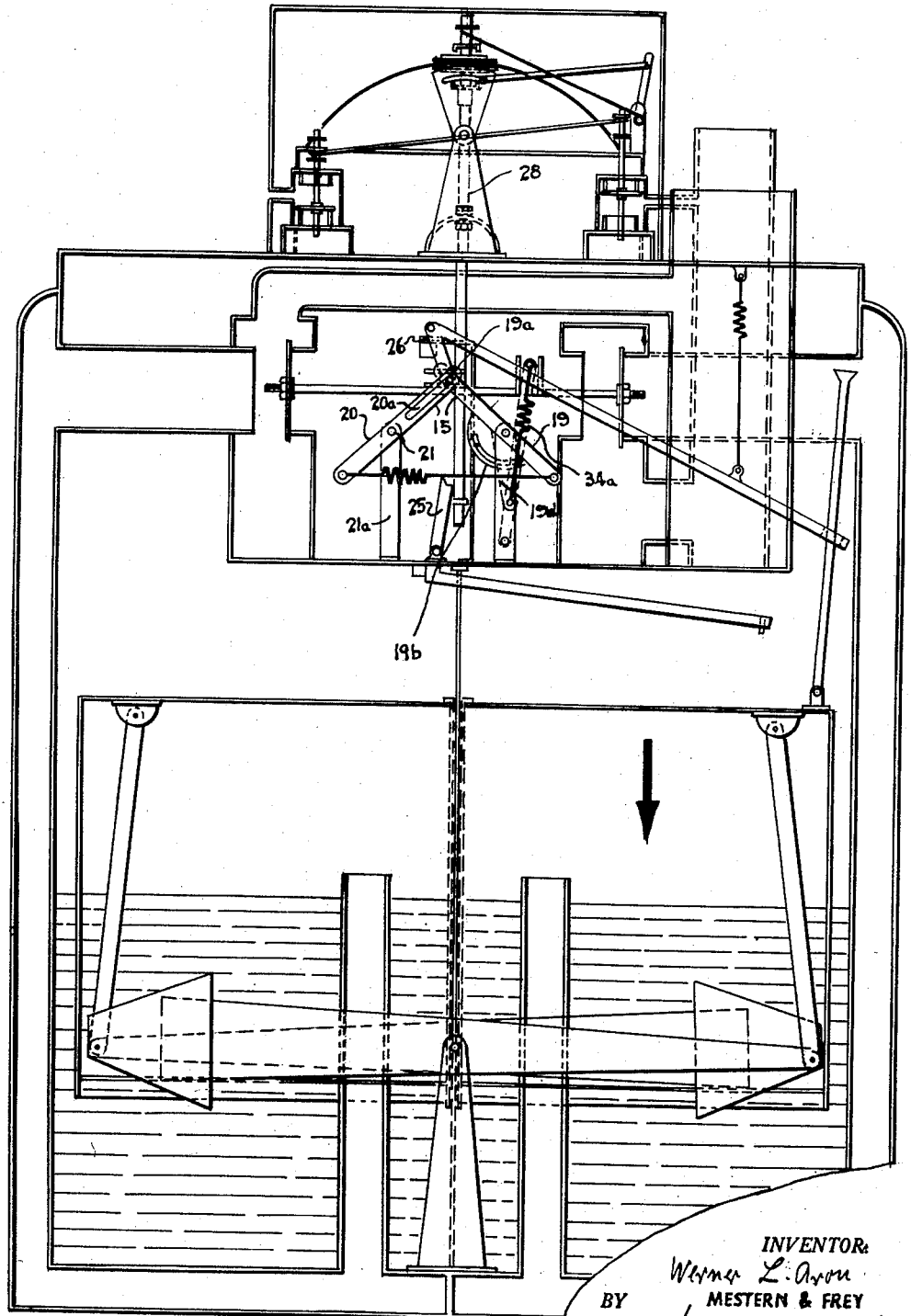
FIGURE XI

United States Patent Office 2,854,845
Patented Oct. 7, 1958

2,854,845
PORTABLE GAS METER PROVER

Werner L. Aron, New York, N. Y.

Application March 31, 1955, Serial No. 498,344

9 Claims. (Cl. 73—3)

This invention relates to a gas meter prover, more specifically to a portable prover.

Conventional gas meter provers are stationary and the gas meters to be tested have to be disconnected and transported from their point of use to the stationary testing prover. It is the object of this invention to overcome this handicap and to provide a portable device which is at least equal in accuracy to the conventional stationary prover.

The new portable prover, according to my invention, is of light weight construction and small size and can be easily transported by only one person. Similar to known gas meter provers, a bell is used to measure the quantity of gas. In the gas prover, according to my invention, however, a light weight bell, which is also sealed in oil, is used for this purpose, and this bell is precisely balanced for its own weight by counterweights.

The operation of the prover is such that the gas flow through the prover is at a uniform rate and no fluctuation in pressure is noticeable on a water column gauge during any point of the cycle.

Contrary to the stationary prover in which a bell is not exactly counterbalanced and in which the weight of the bell provides the differential pressure of force to displace the gas, the portable prover, according to the present invention, has as mentioned above a bell exactly balanced and the motive force for performing the functions of the meter is provided by a small gas-operated servo motor built into the prover.

The gas meter to be tested at the point of use will be connected to the inlet and outlet of the portable prover in a manner that it is only in communication with the compartments formed by the wall of the bell and the sealing liquid. For this purpose my prover has two independent but coordinated working arrangements, namely, the measuring compartments and the motor, their movements depending positively on each other by means to be described below.

In connecting my testing device to the gas meter to be tested in the field the time factor is of extreme importance; that means, the cost of periodical testing and the time used for the means of connection between the test meter and the consumer's meter must be reduced to the minimum practically possible. Therefore, a concentrical inlet and outlet are incorporated in my testing device. A combination of two concentrical hoses is connected to the testing device on one end and to the consumer's gas meter on the other end.

This inlet arrangement is a substitute for one of the normal connections on the consumer's meters which are generally found on every gas meter in the field. The great advantage of my invention consists in the fact that only one connection instead of two has to be exchanged on gas meters which have already been installed.

Until now, gas meters can be adjusted only on the stationary prover before being distributed in the field. This adjustment is a very poor compromise done only with one quantity of consumption (⅕ of the capacity of the meter). Here, testing is done under the most favorable condition for the meter. However, no accuracy of measuring prevails under the countless different conditions which occur in the working of gas meters related to different quantities of consumption, temperature, etc. The test meter and the gas meter are equipped with a counter each, and a comparison between the reading of these two indicators discloses the degree of accuracy, whatever consumption of gas may prevail at the time.

As it is not easy to watch two indicators at the same time, I introduced an audible signal to the indicator of the test meter, so that the observer can read the meter to be tested and is informed periodically by an audible signal of the prover's indicator reading at graduated intervals.

With the above and other objects in view, my invention comprises the improved gas meter prover and the construction and relative arrangement of its several cooperating parts, as will hereafter be fully described, as illustrated in the accompanying drawings.

In the drawings, wherein I have illustrated, as an example, an embodiment of my invention, similar reference characters designate corresponding parts throughout the several views.

Fig. 2 is a top plan view of the gas meter prover.

Fig. 3 is a schematical front view of the gas meter prover showing the signal device.

Fig. 4 is a vertical section of the connector provided in the gas meter to be tested and the plug.

Fig. 5 is a front view of Fig. 4 without the plug.

Fig. 6 shows a horizontal section of the mouthpiece of the connection on the outer end of the hose of the prover.

Fig. 7 is part of the connector shown in Fig. 4 arranged in a position to illustrate the working coordination of the parts shown in Figs. 6 and 4.

Fig. 8 is a front view of Fig. 6.

Fig. 9 is a view similar to Fig. 1 showing the bell in its upward move and the tripping mechanism in the interim position arrested in the lower ratchet and the coordination of the movements of all other parts of the prover in this position of the bell.

Fig. 10 is a view similar to Fig. 1 showing the bell in the highest position with the coordination of the movements of all other parts of the prover in this position of the bell.

Fig. 11 is a view similar to Fig. 1 showing the bell in the downward move and the tripping mechanism in the interim position arrested in the upper rachet and the coordination of the movements of all other parts of the prover in this position of the bell.

Figure 1:
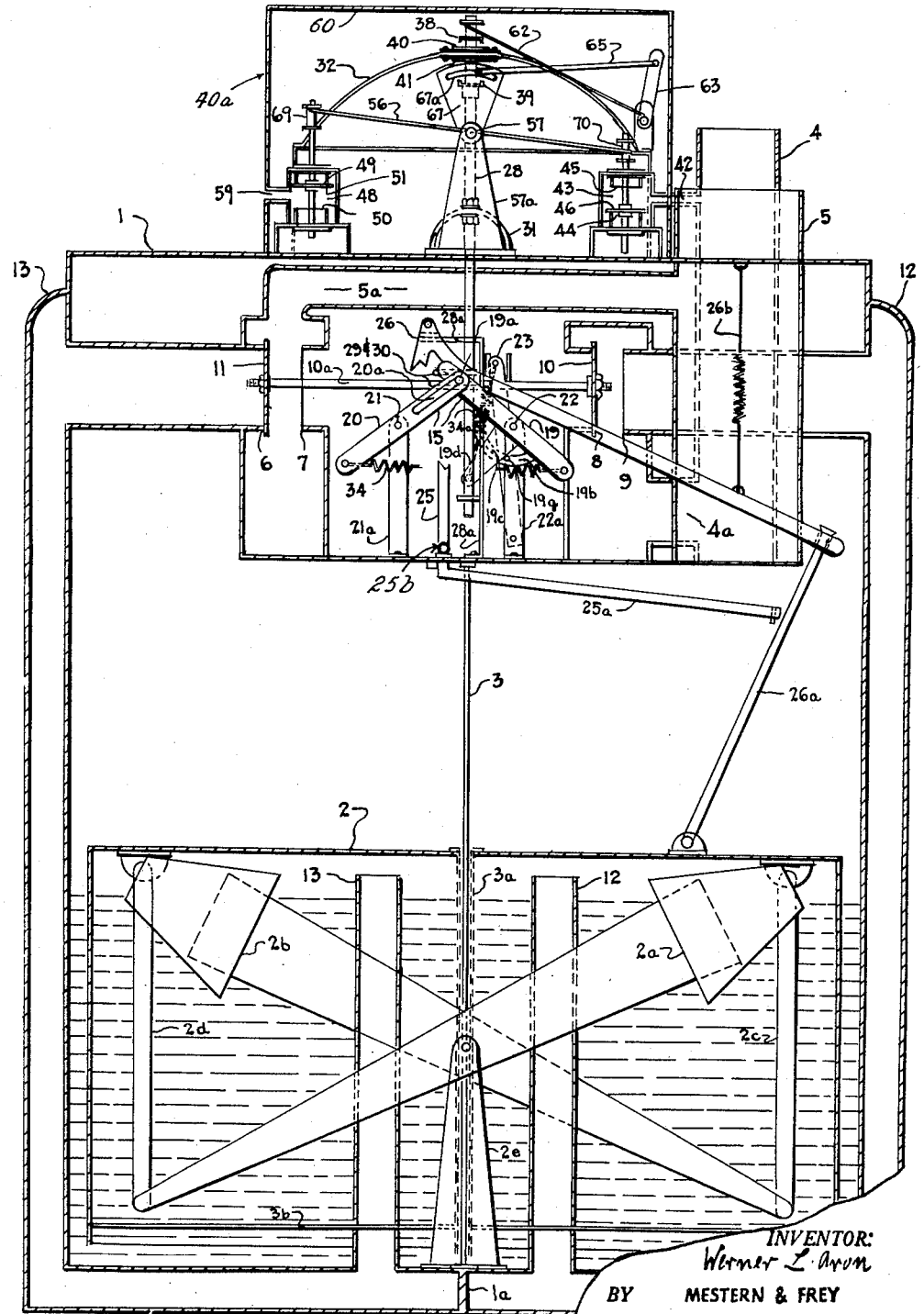
Fig. 1 is a vertical section of a gas meter prover embodying the present invention showing the bell in the lowest position.

Referring in further detail to the drawings a bell 2 provided in housing 1, as shown in Fig. 1, and also in Figs. 9, 10, and 11, is guided on its center on a shaft 3 to perform an upwards and downwards movement over a liquid level, preferably an oil level, its walls traveling through the liquid and forming two hydraulically separated spaces, one between the outer surface of the bell and the inner surface of the housing, the other surrounded by the inner surface of the bell. The bell is counterbalanced by the weights 2a and 2b swinging crosswise on bracket 2e and linked to it by connecting rods 2c and 2d, whereas, a tube 3a centrally fixed on the bell 2 and gliding on shaft 3 performs an hydraulic seal for the center of the bell in its movements upwards and downwards. A cross bar 3b then takes support to the lower end of 3a in a central position of the bell.

The valve seats 6, 7, 8 and 9 in Fig. 1 are closed and opened by valves 10 and 11 conducting the gas stream to the top of the bell or through chambers 12 and 13 under the bell respectively to the outlet of the prover. Valve 10, in the position shown in Fig. 1 on seat 8, permits the gas stream conducted through inlet 4, channel 4a and seat 9 and then through channel 12 separated from channel 13 by a separating wall 1a to enter the space under the bell in housing 1.

Valve 11 provided on valve seat 6 permits the gas to escape from the space over the bell through seat 7 and is conducted from there through duct 5a to outlet 5.

When the valves are thrown over by the tripping mechanism 15 thereby placing them on valve seats 7 and 9 respectively, the gas stream is conducted through channel 4 and its continuation 4a through the open seat 8 to the space above the bell; whereas, the outgoing gas is conducted through duct 13, seat 6, duct 5a and from there to outlet 5.

The tripping mechanism 15 comprises the knee joint with two arm levers 19 and 20, pivoted on axles 21 and 22 turning on brackets 21a and 22a. The levers are related to each other by axle 19a, moving in slot 20a. The valves 10 and 11 are switched by the tripping mechanism to their different positions by means of lever 19 and extension 19d, quadrant 19b, slot 19c and pin 19g overthrow and lever 23 and shaft 28 over cross rod 10a.

As shown in Figs. 9, 10, and 11, two positions between the highest and lowest position of axle 19a and shaft 28 are effected when axle 19a is arrested in the ratchet 25 before it reaches the lowest position and in the ratchet 26 before it snaps to the highest position. Shaft 28 is gliding in vertical direction in bracket 28a. When the overthrow of the valve is performed, spring 34a acts as a holding device for valves 10 and 11, exerting positive pressure on them on the whole period of travel of the bell in either direction. The retracting of ratchet 25 respectively 26 is what actually effects the snapping over of the valve 11 and 10 from one position to the other. Different also from the known arrangement of tripping mechanisms is the absence of any mechanical connection between it and the measuring member, be it, as in my case, a bell or be it a diaphragm.

To move axle 19a and lever 19 and 20 to their arresting positions in the ratchets 25 and 26 respectively, a special motor arrangement is provided on top of housing 1. This motor arrangement is designated in the specification and the claims as servo motor. It comprises a shaft 28, which controls the position of axle 19a, which is guided on shaft 28 between two concentrical cams 29 and 30. Shaft 28 passes the top of housing 1 in the center of a small diaphragm 31, which is rigidly connected on its center to shaft 28 and on its circumference to the circular opening of housing 1 in the center of the latter. It permits the movement of shaft 28 downwards without exposing this movement to the danger of escape of gas as it can occur always in glands and stuffing boxes. The upper end of shaft 28 is connected to the center of diaphragm 32 and the coordinations of the movement of this diaphragm to the different positions of the valves is as follows: for instance, in the position of the valve shown in Fig. 1, the bell, after the release of ratchet 26 by means of connecting rod 26a, starts its upwards movement.

The joint lever system of tripping mechanism 15 has now to make the reversing movement downwards to a position where it is arrested in ratchet 25. The spring 34, being stretched nearly to its maximum in this arrangement, does not exert excessive pressure and friction between axle 19a and ratchet 25 respectively, on the bearings 21 and 22 of the levers 19 and 20. The power necessary to lift or lower shaft 28 to the next position on ratchet 26 and 25 from which it snaps upward and downward and also required to expand spring 34 is provided by the diaphragm 32 of the servo motor. This power is without further linkage directly applied to the shaft 28 by the sealing collars 38 and 39, which are rigidly connected to shaft 28 in a certain distance which permits the diaphragm 32 to glide on the shaft until its rubber covered and rigidly applied washers 40 and 41 are pressed against the sealing collars 38 and 39. If the diaphragm 32 is lifted and pressed against 38, the shaft 28 is lifted too, but the power is applied from the main incoming gas stream through a duct 42. This duct conducts the gas to a valve chamber 43 with valve seats 44 and 45 and valve 46, chamber 48 and the valve seats 49 and 50 and valve 51. By the different positions of these valves 46 and 51 the direction of the gas flow is determined. That means, the valve 46 is seated on valve seat 44 and therefore valve 51 on valve seat 49, the valves being suspended over double arm lever 56 pivoted in bearing 57 supported by bracket 57a, the gas flows through valve seat 45, above diaphragm 32, the diaphragm 32, by moving downwards under pressure from above being arrested in ratchet 25 after passing its middle position. The gas underneath the diaphragm and in the valve chamber 43 can escape only through valve seat 50 and vent 59, the whole mechanism of the servo motor being placed under hood 60 which separates this part of the test meter from the atmosphere. After diaphragm 32 is lowered, bell 2 continues its upwards movement and in its predetermined and upper position, it engages ratchet 25 over lever 25a retracting it from axle 19a. In this moment the shaft 28 is freed and snaps downward causing at the same time to snap the lever system of the tripping mechanism 15, and reversing the valves. At the same time the shaft throws the lever 63 placed under hood 60 by means of the lever 62 over to another position, thereby reversing the valves of the servo motor by means of the connecting rod 65, which engages a slotted quadrant 67 attached to double arm lever 56. By the movement of lever 62 and connecting rod 65, the valves are reversed and now valve 46 rests on valve seat 45 giving the gas entering through branch 42 free access over valve seat 44 to the space underneath diaphragm 32. Whereas, valve 51 is now closing valve seat 50 so that the gas on top of diaphragm 32 can escape through valve seat 49 and vent 59 to the atmosphere.

In Fig. 2 an embodiment of a device is shown, adapted to maintain the tightness of the servo motor valves in the period when pin 19g is idling in slot 19c of quadrant 19b. The device comprises a tube 70 and a steel ball 71 movably provided in said tube. Pipe 70 is rotary pivoted and balanced over bearing 57. This arrangement provides a certain amount of resting pressure on the valves of the servo motor because the steel ball in the hollow body 70 is changing its position by gravity from one side to the other after the shaft 28 has escaped the ratchet. When the ball is running to a position from one end to the other of the hollow body, the valve mechanism of the servo motor reverses in the same way and sense as the main tripping mechanism but in the period in which the main tripping mechanism is lifted or lowered by the pressure of diaphragm 32 to the positions where it is arrested in ratchets 26 and 25 respectively, the weight of the ball secures a tight fit of valves 46 and 51 respectively on the valve seats.

In Figs. 4, 5, 6, 7, and 8, the connecting devices are shown between the portable prover and the gas meter to be tested.

To an outer tubing 80 a nipple 81 is attached on the upper side for connection to the gas and nipple 83 to the tube 80 on the lower side. This nipple is connected by cap nut 84 to the gas meter to be tested. One end of the tubing 80 is closed, the other end is open.

Nipple 81 is separated from nipple 83 by an inner wall 85 in the outer tubing 80. A smaller pipe 86 is concentrically fastened to the inner wall 85 and open on both ends. In a certain distance from the open outer end pipe 86 is perforated by a number of holes 87. A plug 88 is arranged to fit in tube 80 on the open end. A concentric ring valve 89 is gliding on pipe 86 and under pressure of spring 90 pressed against ring 91. The flap 92 hinges on the top side of pipe 86 with a stem-like extension of the rubber surface is pressed against ring 93 which acts as a valve seat when the gas pressure presses the rubber flap against it. When plug 88 is removed, ring valve 89 and rubber flap 92 prevent the escape of gas to the atmosphere by closing.

In Fig. 3 a signal bell 105 is shown attached to the indicator 106 giving a ringing signal after one-tenth of a cubic foot of gas has been consumed. The operation of applicant's gas meter prover is as follows:

To measure the gas passing through the portable prover, the bell 2 is moved up and down, whereby two measuring compartments are formed, one over the bell and one underneath it. The upward movement of the bell is effected by the passage of gas under the bell through inlet 4, channel 4a, open valve seat 9, and channel 12 (Fig. 1). In this instance valve 10 closes seat 8 and valve 11 closes seat 6. The gas above the bell is allowed to escape through open valve seat 7, duct 5a and outlet 5. The downward movement of the bell is effected by shifting the valves to seats 7 and 9, thus permitting the gas to enter the space above the bell through channels 4, 4a, open valve seat 8. The gas underneath the bell can then escape through channel 13, open valve seat 6, duct 5a, and outlet 5. The motive power for shifting the valves 10 and 11 is provided by means of the gas operated servo motor 40a enclosed by hood 60 and connected through appropriate linkage with the valves 10 and 11. The reciprocating movement of the bell 2 actuates links 3c and 3e, and this, in turn, counter 106. The two-armed lever 108a is periodically released by the measuring mechanism and its hammer 109 strikes bell 105. Each division on the dial counter, as for example in applicant's present embodiment, represents 1/10 cubic foot of gas, the amount displaced by one stroke of the bell 2. The bell 2 is made of a light metal and is partly submerged in oil which forms an effective seal between the chamber within the bell and the extension. To counteract the inertia of the bell and an uneven pressure and flow of gas and the bell's consequent oscillation, the counterweights 2a and 2b balance the bell's movement by moving down as the bell travels up and moving up when the bell moves down. To achieve accurate operation of the prover and to prevent slippage and escape of gas, the changeover of valves 10 and 11 must be instantaneous. This rapid changeover is prepared in advance by the servo motor 40a. The power needed to shift the valves is stored in the knee joint when the bell is moving. A stress is created in the knee joint and is arrested by ratchets.

With the bell in the lowest position, connecting rod 26a has pulled ratchet arm 26 into the position shown in Fig. 1. In this position the ratchet pivoting at 28b has swung away from axle 19a. The knee joint consisting of levers 19 and 20 is in its extreme upper position. Arm 19d extending from lever 19 has pulled the spring 34 which is attached to overthrow lever 23 secured to rod 10a. Due to the spring's tension the rod 10a and the valves 10 and 11 have shifted into the position on valve seats 6 and 8 shown in Fig. 1.

Since the pin 19g attached to overthrow lever 19 is capable of idling in slot 19c of quadrant 19b, no resistance is offered to the movement of overthrow lever 19 while the shifting of the valves takes place and the valves remain tightly closed until they are instantaneously thrown over.

At this stage the shaft 28 is in its highest position in housing 60; it has, by means of collar 38, raised the lever 62 and through link 63 pulled connecting rod 62 the end of which idles in the slot of quadrant 67 and the quadrant 67 to one side in coordination with idler 19g. The double arm lever 56 secured to quadrant 67 and in contact with collars 69 and 69a has at the same time switched valves 46 and 49 to the position shown in Fig. 1. Entering gas now passes under the bell through inlet 4, channel 4a, open valve seat 9, and channel 12, thereby lifting the bell 2 and displacing the volume of gas in the chamber above the bell. This displacement is registered on counter 106 through the means described above as shown in Fig. 3.

Simultaneously gas enters through duct 42, the space in the servo motor housing above the diaphragm 32, and exerts downward pressure on the diaphragm. The diaphragm bears down on the sealing collar 39 of shaft 28 and moves the shaft downwardly, shifting the knee joint 19 and 20 to the position shown in Fig. 9, by means of axle 19a engaged between cams 29 and 30 of the shaft. At the end of this downward stroke the axle 19a is engaged by ratchet 25 and the travel of the shaft is arrested. The bell 2, however, continues to travel upwards until its upper surface strikes lever 25a secured to ratchet 25 and pivoting at 25b. The ratchet 25 shifts and releases axle 19a. The knee joint has now shifted the valves 10 and 11 to the position shown in Fig. 10 and the flow of the gas has been reversed. The bell starts its travel downwards. At the same moment the shaft 28 has reversed the servo motor valves and gas entering through duct 42 passes into the housing underneath the diaphragm 32. The pressure of the gas pushes the diaphragm up against sealing collar 38 thereby propelling shaft 28 upwards until its travel is arrested by the engagement of the axle 19a with ratchet 26. The bell moves downwardly, reaches its lowest position and through connecting rod 26a pulls down ratchet 26 thereby releasing the axle 19a. The position of the valves of the measuring compartment and the servo motor are reversed. The cycle is now repeated again. It is important to note that the valve changeover is instantaneous so that there is no drag in any part of the mechanism, especially in the diaphragm.

The operation of the connecting device shown in Figs. 4, 5, 6, 7, and 8 is as follows:

Gas from an outside supply source enters outer tubing 80 through the nipple 81 which is attached to the gas supply pipe entering the customer's premises from the street main. The concentric mouth pieces 94 and 95 extending from the portable prover are attached to the outer tubing 80 and the inner pipe 86. The rubber flap 92 is pushed aside shortly after the mouth pieces cover inlet tubing 80 and inlet pipe 86 by means of the metallic concentric inner piece 96. At the same time the front of the inner mouth piece 95 pushes the ring valve 89 backwards. As the mouth pieces 94 and 95 are pushed further on the outer tube 80 and on the inner pipe 86 respectively, holes 87 are covered by the mouth piece 95 which allows the entering gas to flow from nipple 81 through the inner pipe 86 through mouth piece 95 to the inlet of the prover, then through the prover and from the outlet of the prover to the outer tubing 80 of the gas meter connection after passing the holes 98 and ring 99 between the two concentric hoses. The reverse action takes place when the mouth piece indicated by numerals 94 and 95 is removed. The rubber flap 92 falls against ring 93 and is held tightly against it by gas pressure. The ring valve 89 is pressed by spring 90 against ring 91, preventing the escape of gas through the atmosphere. To restore the normal condition of gas flow, plug 88 is screwed into the outer tubing 80. This connecting device is not yet generally employed in the average installation. Therefore, in using applicant's improved portable prover, a nominal leakage of gas will occur while his prover is being connected, if the consumer's existing meter is not yet equipped with the new connecting device.

My invention may be embodied in other specific forms without departing from the spirit or essential characteristics thereof. The present embodiment is therefore to be considered in all respects as illustrative and not restrictive, the scope of the invention being indicated by the appended claims. All changes which come within the meaning and range of equivalency of the claims are therefore intended to be embraced therein.

The principle of my invention will be applicable, for instance, to provers comprising more than two measuring chambers.

What I claim is:

1. A portable light-weight prover for testing gas meters comprising in combination a main gas prover housing formed for holding oil in the lower portion thereof and provided with gas inlet and outlet pipes; a vertically movable bell disposed in said housing having its outer walls spaced from the walls of said housing, said bell immersed in oil contained in said housing, thereby forming measuring chambers, one above and the other underneath said bell; balancing counter weights movably secured to said bell for balancing same; tripping means in the upper portion of said housing for reversing the direction of the travel of said bell, said means comprising at least two reversible valves for changing the direction of the gas flow to allow the entrance of gas under the said bell and the exit thereof from the chamber above it in the said housing; channels connecting the said inlet and outlet pipes through said reversing and tripping mechanism to allow the entrance and exit of gas into the said chambers for causing the bell to move up and down through gas pressure; a gas-operated servo motor secured exteriorly to the upper portion of the said housing cooperating with the reversing and tripping mechanism; link means connecting said servo motor with the reversing and tripping mechanism and acting in coordination therewith; a counter operatively connected with the said bell for measuring the flow of gas through the chambers in said housing; link connecting means connecting said bell with the said counter; connecting means in said prover for connecting same and the meter to be tested, said connecting means being formed for the concentric attachment pipes.

2. The structure of claim 1 provided with a vertically substantially centrally disposed wire having one end secured to the said tripping mechanism and its other end to the bottom of the said main housing, a tube centrally fixed on the said bell and slidingly engaged with said wire, said wire and said tube being formed of a length sufficient to form a hydraulic seal between said measuring chambers.

3. The structure of claim 2, wherein the said tripping mechanism comprises a supporting frame, a pair of upright spaced brackets secured to said frame, a pair of double armed levers, each pivoting on one of said brackets, a lateral shaft passing through adjacent ends of said levers to form a pivoted knee joint, a spring connecting the opposite ends of said double armed levers, a vertically slidable shaft mounted in said frame and provided with a pair of spaced horizontal cams engaging said lateral shaft for flexing said knee joint in opposite directions and means connected with said vertical shaft for reversing the movement thereof and the position of the knee joint.

4. The structure of claim 3 and a pair of ratchets engaging the said lateral shaft for arresting the tripping mechanism in two opposite positions, one of said ratchets pivotally mounted on the said supporting frame of the said reversing and tripping mechanism, a connecting rod pivotally attached to the said bell at one end, and the end of the other of said ratchets pivotally attached substantially centrally of said connecting rod.

5. The portable light-weight prover of claim 1, in which said servo motor comprises an inlet valve and an outlet valve, said inlet valve having an area larger than the area of the said outlet valve, a resilient double arm lever actuating said valves, and means for opening and closing said valves.

6. The structure of claim 4 and a housing for the said servo motor mechanism, said vertical shaft extending into said housing, a diaphragm in said housing engaging said vertical shaft for imparting movement thereto, said housing being provided with inlet and outlet ports adjacent said servo motor, inlet and outlet valves for the flow of gas, so that pressure may alternately be exerted on each side of said diaphragm for the movement thereof.

7. The structure described in claim 1 in combination with a gas supply source, a connecting device for connecting the said gas supply source and the said portable light-weight prover and a gas meter to be tested, said connecting device comprising an outer tube, a first nipple attached at one end of said tube to one side of said tube for connection to the said gas supply source, a second nipple attached to the other side of said tube for the connecting device joining to a gas meter to be tested, an inner wall separating said nipples, an inner tube concentrically mounted in said outer tube and provided with apertures in the wall thereof, a removable plug for closing the other end of said outer tube, a concentric ring valve slidable between the said inner and outer tubes, a resilient flap secured in the inner tube between the said ring valve and said plug for closing the tube end, and a spring means for closing said ring valve and means for securing said connecting device to the gas supply source, including a concentric tubing on the meter to be tested.

8. The structure of claim 1, wherein the link means connecting the said bell with the said counter comprise in combination with the counter a pair of rods joined at the end of one rod, pivotally mounted on the said bell end of the other rod connected to the said counter, said rods having their other end pivotally joined.

9. The structure of claim 1 and an audible signal mechanism operatively connected and cooperating with the said counter, said audible signal mechanism comprising a signal bell mounted on the said main gas prover housing, a two-armed hammer lever pivotally mounted on said housing adjacent said signal bell, having one end formed as a hammer and the other end linked with the said counter for striking said signal bell at spaced intervals.

References Cited in the file of this patent

UNITED STATES PATENTS

| | | |
|---|---|---|
| 1,061,271 | Dezendorf | May 13, 1913 |
| 1,097,834 | Anderson | May 26, 1914 |
| 1,934,291 | Baas | Nov. 7, 1933 |
| 2,555,771 | Watson | June 5, 1951 |